UNITED STATES PATENT OFFICE.

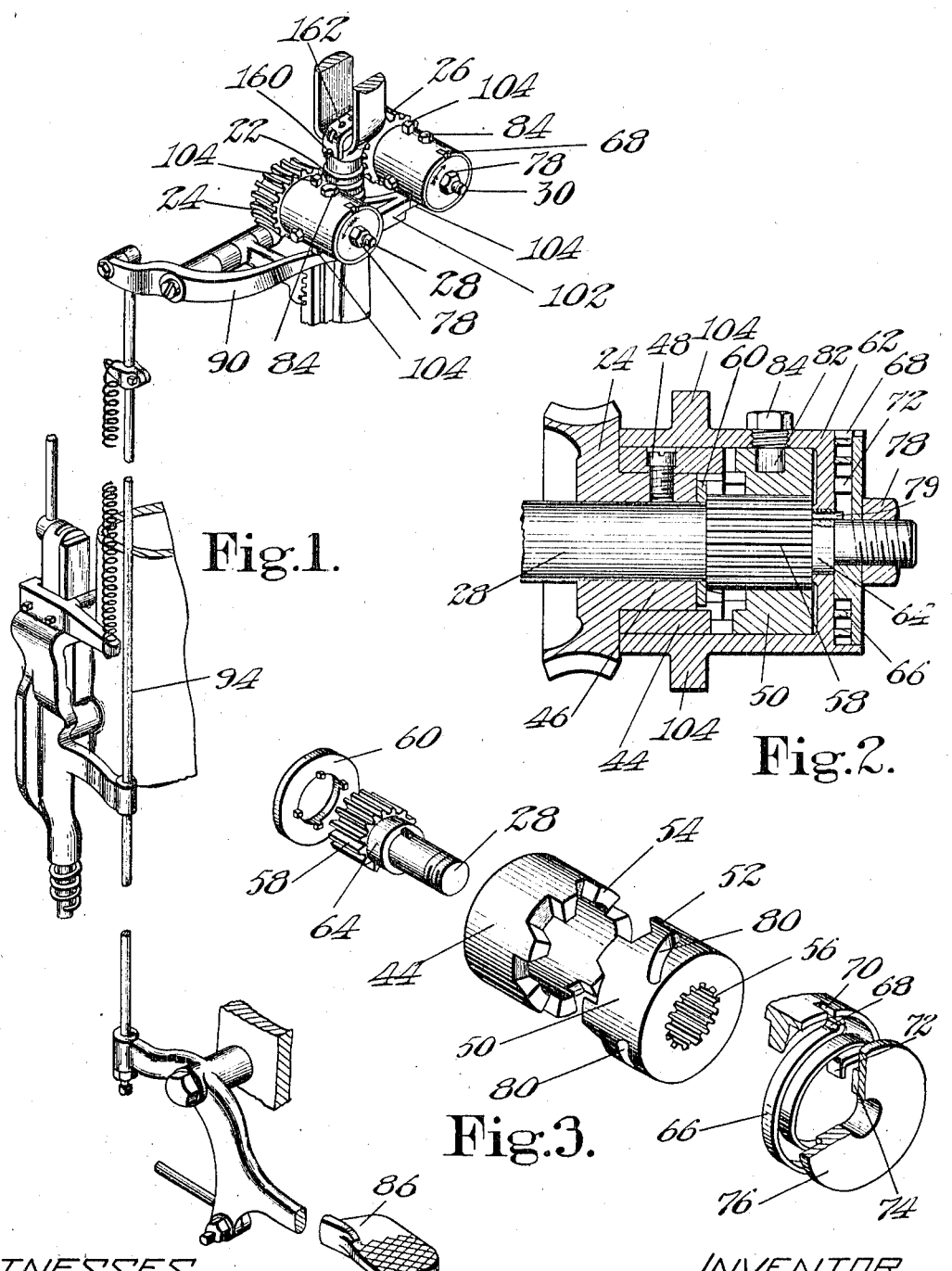

LOUIS A. CASGRAIN, OF BEVERLY, MASSACHUSETTS, ASSIGNOR TO UNITED SHOE MACHINERY COMPANY, OF PATERSON, NEW JERSEY, A CORPORATION OF NEW JERSEY.

CLUTCH.

1,116,385.      Specification of Letters Patent.      Patented Nov. 10, 1914.

Original application filed November 22, 1910, Serial No. 593,667. Divided and this application filed April 19, 1913. Serial No. 762,349.

*To all whom it may concern:*

Be it known that I, LOUIS A. CASGRAIN, a citizen of the United States, residing at Beverly, in the county of Essex and State of Massachusetts, have invented certain Improvements in Clutches, of which the following description, in connection with the accompanying drawings, is a specification, like reference characters on the drawings indicating like parts in the several figures.

This invention relates to clutches and particularly to clutches which are especially adapted for use in connecting together a driving and a driven part where it is important that the driven part shall be clutched to the driving part at a particular angle of rotation of said driving part.

An object of the invention is to provide a clutch which is very compact and light, whereby it does not take up much room in the machine and when mounted upon the shaft does not add much inertia to the driven parts, and yet which is positive and certain in its operation and very easily controlled.

A further object of the invention is to provide a clutch which is so controlled in its operation that a plurality of these clutches may readily be arranged to be controlled from a single member.

Other objects and important features of the invention will appear hereinafter.

In the accompanying drawings, which illustrate the preferred form of the invention as it is applied to the machine of the co-pending application, Serial No. 593,667, filed Nov. 22, 1910, for Letters Patent for improvements in machines for inserting fastenings, of which application the present application is a division:

Figure 1 is a perspective detail showing two of the clutches of this invention controlled from a single member, as these clutches are arranged in the machine of the said co-pending application; Fig. 2 is a longitudinal section through the clutch, and Fig. 3 is an exploded view showing in perspective detail the more important elements of the clutch.

In the machine of the said co-pending application the parts to be driven are lateral horizontal shafts upon which are loosely mounted worm gears 24 and 26 driven from a worm 22 upon a vertical spindle 6. The clutches, of which two are shown in Fig. 1, are arranged to clutch these gears simultaneously to the respective shafts 28 and 30.

The clutches are identical in construction, except that they are arranged to operate upon shafts turning in opposite directions. Each clutch comprises a toothed collar 44 clamped upon the hub 46 of one of the worm gears 24, 26, by a screw 48, the worm gear being free to turn upon its shaft until the clutch member 44 is engaged by another clutch member 50 having teeth 52 which interlock with the teeth 54 of the clutch member 44, the clutch member 50 being also provided with inwardly projecting teeth 56 which interlock with correspondingly shaped teeth 58 upon the lateral shaft, the teeth 58 extending longitudinally of the shaft for some distance to serve as guides for the clutch member 50 as said clutch member is moved into and out of clutching relation to the clutch member 44. Between the toothed enlargement of the lateral shaft and the end of the hub 46 of the worm gear is a washer 60.

The movement of the clutch member 50 longitudinally of the shaft into clutching engagement with the clutch member 44 is preferably effected automatically, the illustrated means for effecting such movement comprising a clutch casing 62 arranged to turn upon a shouldered portion 64 of the lateral shaft 28 or 30 under the action of a spiral spring 66, said spring 66 having an offset end 68 which enters a notch 70 in the casing 62 and another offset end 72 which enters a notch 74 in the hub of a disk 76 clamped between the shoulder 64 of the lateral shaft and a nut 78 threaded upon the end of said shaft, a pin 74 extending from said shoulder into a slot in said hub. The clutch member 50 is provided with spirally arranged grooves 80 into which project studs 82 formed upon the ends of screws 84 threaded into the casing 62. As the casing 62 turns relatively to the toothed enlargement of the lateral shaft, the studs 82 traveling in the slots 80, move the clutch member 50 longitudinally of said shaft.

In order to effect the movement of the clutch member 50 out of clutching relation to the clutch member 44, the clutch casing 62 is held against rotation while the lateral shaft 28 or 30 continues to rotate. The studs 82 being stationary, the spiral grooves 80 turn relatively to these studs and thus move the clutch member 50 longitudinally of the lateral shaft out of engagement with the clutch member 44. The operation of the clutches may be controlled by any suitable manually operated means, such, for example, as a treadle. The illustrated means comprises a lever 90 fulcrumed in the machine head and connected by a rod 94 with the rear end of a treadle 86, as more fully shown in the co-pending application hereinabove identified. At its forward end the lever 90 is provided with stop portions 102 which lie in the paths of rotation of lugs 104 formed upon the casings 62 of the twin clutches when the lever 90 is in its normal position, that is when the forward end of the lever 90 is in its uppermost position in which it is normally maintained by a spring, not shown.

Each of the clutch casings is provided with two of the lugs 104, since the worm gears 24 and 26 may be unclutched from the lateral shafts 28 and 30 at either of two angles of rotation of said shafts, in view of the fact that the cams upon the shaft 28 are shaped to operate for each half rotation of the shaft 28. When the treadle is depressed, the forward end of the lever 90 is lowered and the stops 102 are moved out of engagement with the lugs 104 upon the clutch casings 62, thus permitting these casings to be turned under the action of the springs 66 to move the clutch members 50 longitudinally of the lateral shafts 28 and 30 into clutching relation to the clutch members 44, thereby simultaneously connecting the gears 24 and 26 to the shafts 28 and 30, respectively.

Having described my invention, what I claim as new and desire to secure by Letters Patent of the United States is:—

1. A clutch for connecting a driven part to a driving part comprising interlocking members relatively movable along the axis of rotation of the parts to be connected, a clutch casing surrounding said clutch members and rotatably mounted upon one of said parts, and connections between said casing and one of said clutch members whereby rotary movement of said casing about said axis of rotation effects said relative movement.

2. A clutch for connecting a driven part to a driving part comprising interlocking members relatively movable along the axis of rotation of the parts to be connected into and out of interlocking relation to each other, a clutch casing surrounding said clutch members and rotatably mounted upon one of said parts, a spring coiled within said casing and connected at one end to said casing and at its other end to one of said parts, and connections between said casing and one of said clutch members whereby rotary movement of said casing under the action of said spring effects the aforementioned relative movement of said clutch members.

3. A clutch for connecting a driven part to a driving part comprising interlocking members relatively movable along the axis of rotation of the parts to be connected into and out of interlocking relation to each other, a clutch casing surrounding said clutch members and rotatably mounted on said parts, a spring confined in said casing and connected at one end to said casing and at its other end to the driven part, connections between said casing and one of said clutch members whereby a rotary movement of said casing in one direction separates said clutch members and puts the spring under tension and rotary movement in the other direction brings said clutch members into clutching relation and tends to relieve the tension upon said spring, all of said parts being carried by and rotating with the driving and driven parts when said parts are clutched together.

4. In a clutch construction for simultaneously connecting a plurality of driven parts to their respective driving parts, a plurality of clutches each comprising clutch members relatively movable into interlocking engagement along the axis of rotation, a clutch casing movable about said axis of rotation relatively to one of said clutch members and so connected to said member as to effect movement of said member along the axis of rotation, a spring connected to the driven part at one end and to the casing at its other end for effecting the relative movement of the clutch member and the casing in the clutching direction, a stop on each casing and a single member arranged to be brought into the path of movement of said stops so that said stops are simultaneously engaged by said member and may be simultaneously released by said member.

In testimony whereof I have signed my name to this specification in the presence of two subscribing witnesses.

LOUIS A. CASGRAIN.

Witnesses:
MABEL A. SWEET,
CHESTER E. ROGERS.